United States Patent
Birch

(10) Patent No.: US 7,596,598 B2
(45) Date of Patent: Sep. 29, 2009

(54) MULTI-MEDIA TOOL FOR CREATING AND TRANSMITTING ARTISTIC WORKS

(75) Inventor: Michael Birch, San Francisco, CA (US)

(73) Assignee: Birthday Alarm, LLC, San Francisco, CA (US)

( * ) Notice: Subject to any disclaimer, the term of this patent is extended or adjusted under 35 U.S.C. 154(b) by 413 days.

(21) Appl. No.: 11/546,159

(22) Filed: Oct. 10, 2006

(65) Prior Publication Data

US 2007/0094328 A1 Apr. 26, 2007

Related U.S. Application Data

(60) Provisional application No. 60/729,134, filed on Oct. 21, 2005.

(51) Int. Cl.
G06F 15/16 (2006.01)
G06F 17/00 (2006.01)

(52) U.S. Cl. .................. 709/205; 709/204; 709/217; 715/200

(58) Field of Classification Search .......... 709/201, 709/203, 204, 205, 217, 218, 219; 715/200
See application file for complete search history.

(56) References Cited

U.S. PATENT DOCUMENTS

| | | | | |
|---|---|---|---|---|
| 6,401,085 B1 * | 6/2002 | Gershman et al. | ............. | 707/4 |
| 6,411,991 B1 * | 6/2002 | Helmer et al. | ............. | 709/217 |
| 6,925,645 B2 * | 8/2005 | Zhu et al. | ............. | 718/106 |
| 6,988,138 B1 * | 1/2006 | Alcorn et al. | ............. | 709/225 |
| 7,356,563 B1 * | 4/2008 | Leichtling et al. | ............. | 709/204 |
| 7,493,396 B2 * | 2/2009 | Alcorn et al. | ............. | 709/225 |
| 2002/0046249 A1 * | 4/2002 | Shiigi | ............. | 709/206 |
| 2002/0171731 A1 * | 11/2002 | Saund | ............. | 347/109 |
| 2003/0095113 A1 * | 5/2003 | Ma et al. | ............. | 345/175 |
| 2003/0167304 A1 * | 9/2003 | Zhu et al. | ............. | 709/205 |
| 2004/0158495 A1 * | 8/2004 | Gennaro et al. | ............. | 705/23 |
| 2004/0249899 A1 * | 12/2004 | Shiigi | ............. | 709/206 |
| 2006/0089820 A1 * | 4/2006 | Yu et al. | ............. | 702/186 |
| 2006/0101022 A1 * | 5/2006 | Yu et al. | ............. | 707/10 |
| 2006/0167662 A1 * | 7/2006 | Yu et al. | ............. | 702/186 |
| 2007/0263836 A1 * | 11/2007 | Huang | ............. | 379/265.01 |
| 2008/0098030 A1 * | 4/2008 | Edd et al. | ............. | 707/102 |
| 2008/0204545 A1 * | 8/2008 | Ferren et al. | ............. | 348/14.12 |

* cited by examiner

*Primary Examiner*—Ario Etienne
*Assistant Examiner*—Sargon N Nano
(74) *Attorney, Agent, or Firm*—Dergosits & Noah, LLP

(57) ABSTRACT

A system for collaboratively producing artwork includes a server and a plurality of user computers coupled to a network. The server transmits a request for submissions to collaborators and who prepare portions of the artwork using multimedia tools provided by the server computer. The collaborators transmit their completed portions of the artwork back to the server computer where they are compiled and transmitted to a recipient on a designated time.

6 Claims, 8 Drawing Sheets

| Drawing by Ann | Recording by Ben | Photos by Chuck |
|---|---|---|
| | | |
| Video by Diane | Animation by Eric | Text Message by Felicia |
| | 981 | |
| Photos/Recording by Greg | Poems/video by Hal | Drawings/Recording by Ida |
| | | |

991

995

Fig. 11

MULTI-MEDIA TOOL FOR CREATING AND TRANSMITTING ARTISTIC WORKS

CROSS REFERENCE TO RELATED APPLICATIONS

The present invention claims priority to U.S. Provisional Patent Application No. 60/729,134 filed Oct. 21, 2005 which is hereby incorporated by reference.

BACKGROUND

With Internet technology, electronic greeting cards or eCards have been developed which are transmitted by e-mail to recipients. Historically eCards have aimed at replicating the features of paper cards online. They have the added value of being animated and can include audio. The eCards are typically selected from a limited catalog of preprogrammed eCards. Once the desired card is selected, the user writes a message that is displayed as text with the eCard. The user provides the destination e-mail address and the selects a date to transmit the card. On the designated date, an e-mail notification is sent to the recipient with a link to a web site that allows the recipient to view the eCard. By clicking on the link, the browser is directed towards the eCard server and the card is displayed.

A problem with eCards is that they are perceived by users as being a 'cheap' and 'less thoughtful' alternative to paper cards. The present invention aims to address this issue and provide an online alternative to celebrating someone's birthday or any other occasion that will be perceived as being more thoughtful than traditional paper cards or even physical gifts.

SUMMARY OF THE INVENTION

Currently online greeting cards are meant to be sent from one sender to one recipient. In an embodiment, the present invention allows multiple users to collaborate and combine their efforts to produce the multi-media art works. This feature is intended to simulate the real-life experience of passing around a greeting card for multiple senders to 'sign' and pass-on for others to sign before the recipient receives the card. Other features include reminders to collaborative artists so that the works will be completed and can be presented to the recipient by the due date.

The present invention is multi-media tool that allows users to quickly create highly personalized electronic artwork using a choice of multi-media tools which may include any combination of: drawings, audio recordings, video, photos, animation, text, and interactive works. These electronic artworks can then be transmitted to a recipient at a predetermined date such as a birthday, graduation, holiday or wedding anniversary.

The present invention is an improvement over the eCards that provide more personalization that a predefined eCard. The inventive multi-media tool is intended to provide a means for quickly and easily creating personalized works that will be appreciated by recipients more than eCards. Rather than only providing an original text message, all aspects of the multi-media artwork can be produced by the collaborators of the artistic work including the visual, audio, animation and text content. The tools used the create the collaborative artwork can include drawing tools, audio tools, video tools, photo tools, animation tools, text tools, interactive tools, etc.

In an embodiment, a group of collaborators are selected to prepare individual works. The inventive system provides invitations to the collaboration to a selected group and the due date that the work should be completed. If the collaborator accepts the invitation, the system provides tools for creating the artworks through a computer graphical user interface. Each collaborator can select one or more tools to create artwork. The tools can be used to create multiple works or a combination of tools can be used to create a single work. The collaborators may be able to view each other's progress or make complimentary works or help each other with the works. In other embodiments, the system may require a sequential series of works, so that the second work cannot begin before the first work is completed, etc.

The system monitors the program of the collaborators and can send reminders to the collaborators and issue warnings when the deadline approaches. When all of the works are completed by the collaborators, the system compiles the works into a single presentation for the recipient. The system or an administrator may review the content of each work before it is sent to the recipient. The compiled artwork is transmitted to the recipient on the designated date and time. Because each work may require the full computer screen for viewing, an icon may be assigned to each work. In an embodiment, the inventive tool may display a first screen that shows a grid of squares, cubes or other icons that each represent a different artwork. In different embodiments, nine squares may be displayed in a two dimensional 3×3 grid or eight squares may be displayed in a three dimensional 2×2×2 cube. The recipient may actuate each work by clicking on one of the icons.

BRIEF DESCRIPTION OF THE DRAWINGS

FIGS. 5 and 6 illustrate an embodiment of the animation tool;
FIG. 11 is an embodiment of the collaborative artwork.

DETAILED DESCRIPTION

Figure 1:
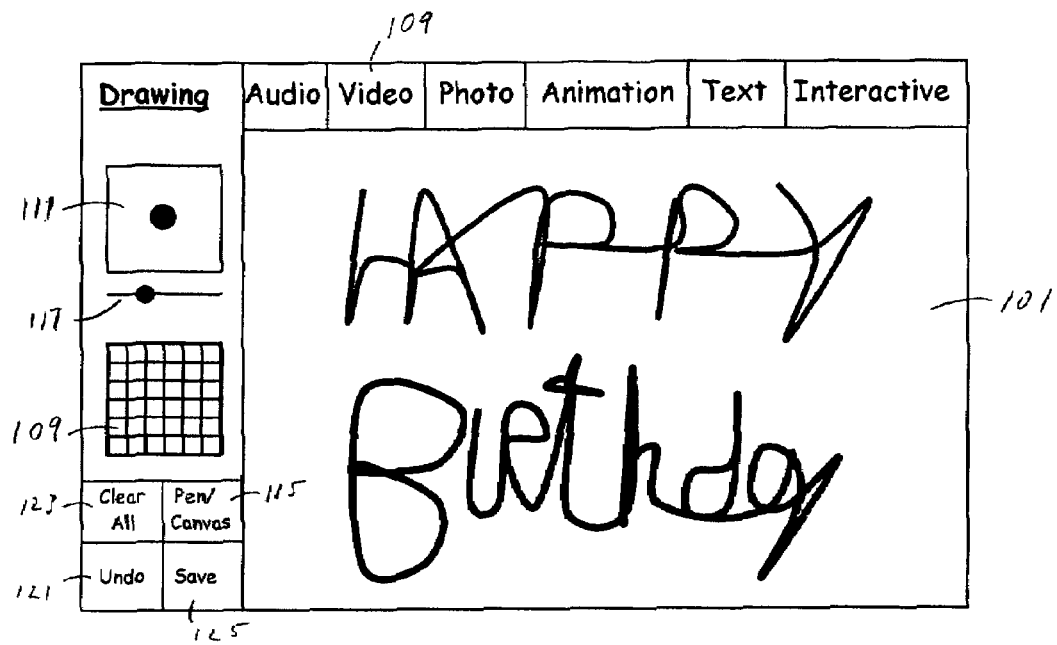
FIG. 1 illustrates an embodiment of the drawing tool.

The present invention is directed towards a web based system for creating collaborative multi-media works of art. The system uses a server computer and a plurality of user computers that are coupled through a network such as the Internet. In the preferred embodiment, the inventive multi-media system is accessible through a website that allows the user to access tools to create multi-media artistic works through a browser program. In order to facilitate the combining of different types of works, the system uses different tools to create different types of artwork or input other works of art. These tools include: a drawing tool, an audio tool, a video tool, a photo tool, an animation tool, a text tool, and an interactive tool, etc. In an embodiment, the web site provides a set of tools that can be accessed by any number of users. With reference to FIG. 1, in an embodiment, the user interface provides a plurality of tools that are accessed through tabs 109 on the user interface screen 101. By clicking on a tab 109 with a pointing device that is coupled to the user computer, the desired tool is activated in the user interface screen 100.

Although a set of specific set of tools and features are described, it is contemplated that various other tools and features can be used with the present invention. The operations of the exemplary set of tools is described in more detail below.

Drawing Tool

If the "drawing" tab 109 is selected, a drawing tool 101 is displayed on the screen and is used to create an original drawing. The drawing tool 101 allows the user to create free hand drawings with various sized markers, colors and other special effects. In an embodiment, the drawing tool 101 is a flash based application that can be used to create drawings using a computer pointing device such as a mouse. With reference to FIG. 1, a screen shot of a simple embodiment of the drawing tool graphical user interface 101 is shown. The user can use a pen/canvas button 115 to select the pen features. A pen tip size tool 111 is used to control the size of the pen tip and a color pallet 109 to control the color of the pen. By sliding the tip size tool 111, the pen tip size changes as indicated by the pen size indicator 113. By clicking the mouse cursor on the grid of colors 109, the pen color is selected. In other embodiments, the user may click on the pen function 105 to display the color options, move the cursor over the desired color and release the mouse button to select the desired color. In addition to the pen color, the user can also control the background canvas color. In this example, the user has written "Happy Birthday"

By clicking the mouse cursor on the "pen/canvas" function 115, the color pallet 109 is used to select possible background colors. Clicking on a specific color changes the background of the canvas to the desired color. The pen size is displayed as a circle 111. The pen size 111 is controlled by sliding the control button 117 with the mouse. The user clicks on the button and slides the button 117 until the desired pen size circle 111 is reached. The user releases the button 117 to select the desired pen size 111. The user can also select the marker color in the same way that the canvas color is selected.

Once the color and pen tip size are selected, the user can bring the pen to the board and draw by moving the mouse while holding the mouse button down. The user can change the color and pen size while drawing so that the lines of the illustrations will be different in appearance. It is contemplated that various other methods may be used to select a marker or canvas color and control the drawing tools. For example, the color may be selected from a pull down menu or via keyboard inputs. The movement of the marker on the drawing area may be controlled with other pointing devices such as trackballs, digitizer pads, etc.

The drawing tool also includes other editing features. The "Undo" 121 command removes the last change to the drawing. The "Clear All" 123 command removes all marks from the drawing so the canvas is clear. In the example, the user has created a picture that includes seven horizontal stripes of colors and a face composed of several smaller dots. When the drawing is complete, the user clicks on the "save" button 125 and the picture is saved as a GIF image or any other graphical file format. Although, only a few of the drawing program features are disclosed, it is contemplated that many other drawing features may be integrated into the inventive system.

In other embodiments, multiple users can simultaneously work on a single collaboration illustration. If the other users accept the invitation, all users will view the same drawing area and be able to add markings to the collaboration illustration. The illustration page is modified by both users so all markings are immediately shown as they are being made. The system may also allow for instant messenger and/or voice over internet so that the users can communication by text or voice as they prepare the illustration.

In yet another embodiment, the drawing tool may include format controls that allow the user to control the layout and content of the posted text and drawings of the user's graphical user interface. The text and illustrations may be placed in the same drawing area and saved in a GIF image or any other graphical file format.

Audio Tool

If an audio is selected, an audio recording tool user interface 201 is displayed on the screen. The audio tool can be a flash based application that can be used with web browsers, e-mail and other web based programs to create audio messages. The audio tool allows the user to record and play back audio recordings using a pointing device such as a mouse coupled to a computer to control the recording control buttons. The computer must have or be coupled to a microphone and a speaker or headphones.

Figure 2:
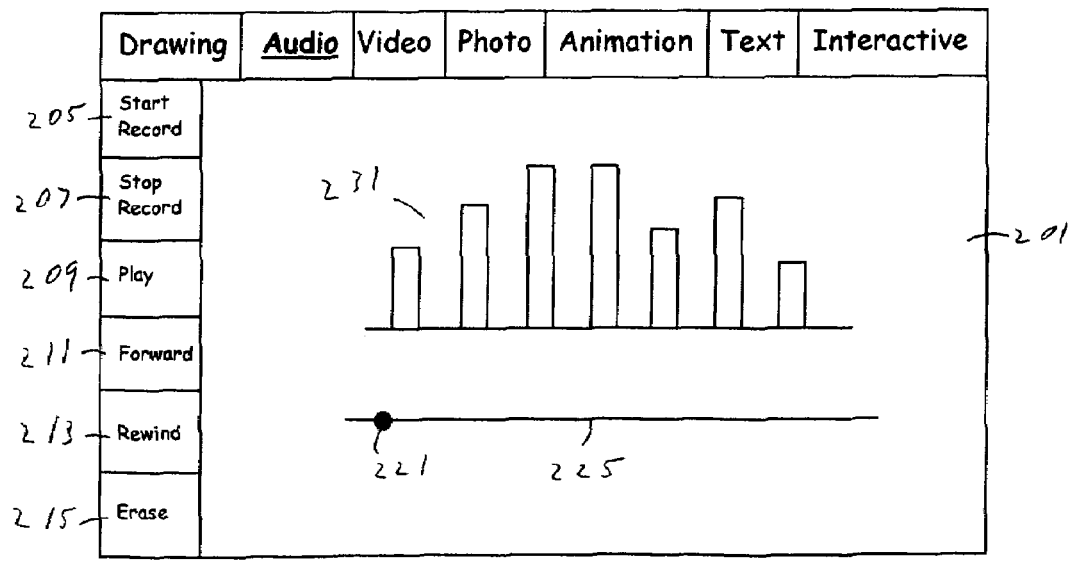
FIG. 2 illustrates an embodiment of the audio tool.
Figure 3:
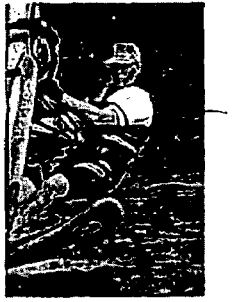
FIG. 3 illustrates an embodiment of the video tool.

With reference to FIG. 2, the user can create an audio recording by clicking on the "start record" button 205 and transmitting audio signals to the microphone. When the desired audio signals are complete, the user can press the "stop record" button 207. The user can then review the recording by clicking on the "play" button 209. The user can skip forward or backwards within the playback of the recording using the "forward" 211 and "rewind" 213 buttons. If the recoding is unsatisfactory, the user can use the erase 315 button to erase the recording. The playback time of the recording may be illustrated as a marker 221 on a line 225 having a length that represents the entire duration of the recording. When the recording is played back, the marker 221 moves on the line 225 towards the right. In an embodiment, clicking and dragging the marker 221 is an alternative method for controlling the playback of the recording. The recording interface 201 may also include a graphical bar display 231 or any other display pattern. In an embodiment, the bar display 231 may represent the amplitude of different audio frequencies. The left side may represent lower frequencies and the right side higher frequencies.

The audio tool may also include other editing features that allow the user to apply special effects to the audio recordings. These special effects may include: echo, reverberation frequency equalization, tonal controls, harmonic distortion and any other audio effects. The system may also allow for other input devices a record button that allows the user to digitally record any sounds such as a voice or musical instruments transmitted into the computer's microphone. The recordings setting can record the sounds as unaltered or add special effects such as echoes, distortions, reverberation and wavelength filtering. The recording tool then allows the user to hear the recording before saving the recording. The recording tool may also have editing features that allow the recording to be altered, such as recording additional material over the original recording, removing portions of the recording, changing the speed of the playback, etc. The audio recording tool may be used in combination with any of the visual tools to add sounds to these works.

In addition to recording audio sounds, the system may also include pre-recorded sound effects that can be mixed into the recording. These pre-recorded sounds can be a laughter, applause, groaning, coughing, etc. The pre-recordings may also include words such as: Yes, No, Maybe, D'oh and other words/phrases. The sound effects and pre-recordings may be actuated while the recording is being made by clicking on the appropriate effects button. Alternatively, the added sounds may be added during editing and resaved. The audio files may be in various formats including: WMA, MP3, WAVE or any other audio format.

Video Tool

If the video is selected, the video recording tool is activated. The video tool includes a video graphical user interface 301 that allows the user to record video and audio from a camera and microphone on the user's computer. The camera is focused on the subject and video data is collected through a lens and a CCD "charge-coupled device" which converts the optical image into electrical signals. An analog-to-digital converter digitizes the imager (analog) waveform output into a discrete digital-video signal. The recorder, stores the videosignal onto a digital memory device. The video camera may be coupled to the user's computer in many different ways. The video camera and microphone may be built into the computer and use the computer's internal memory to store the video data. An external video camera may be coupled directly to the computer.

If an internal video camera is used, the user can control the recording by clicking on the "record start" button 311. The images from the video camera may be displayed on the screen 337 so that the user can see the images and make adjustments before and during the recording. When the recording is complete, the user can click on the "record stop" button 313. The system may also include camera controls so that the recording can be controlled. For example, the system may include a zoom feature that is actuated by clicking on the "zoom" button 331. The angle of the camera can be controlled by clicking on the "pan" button 329 and directing the camera within the displayed image. The system may also be able to frame a specific area using the "frame" button 335 and outlining an area of the image to frame with the pointing device. Because the camera may be built into the computer screen, the zoom and pan may be digital rather than optical. More specifically, rather than providing a zoom lens or changing the angle of the camera, the system may only display information from the pixels associated with the area of interest and magnify these pixels. Because the camera may have a large number of pixels, the decrease in resolution may not be noticeable.

The video tool may also allow the user to input video recordings made on a camcorder or a digital camera away from the user's computer. In this embodiment, the video information may be temporarily stored on the camcorder memory. By coupling the computer memory to the computer, the user can access the video footage and edit the material to create the video work. If the internal memory of an external video camera is used, the computer must have the required hardware connections, either video cables or a connection for the memory device. In other embodiments, the video camera may have removable memory such as flash memory, microdrive or a recordable cd/dvd. Various formats of video information can be used including: MPEG, AVI, RealVideo, and QuickTime.

Once the video information has been recorded and is downloaded to the computer memory, the inventive system includes viewing and editing tools. Like the audio recording tool, the video recording tool allows the recording to be played back for editing of video sequences on a computer. The video can be viewed by clicking on the "playback" button 317 the playback can also be controlled with the marker 331 that moves on the line 335 towards the right by clicking and dragging the marker 331. Individual frames of the recording can be viewed by clicking on the "step" button 325. If the user wishes to delete the entire recording, the user can click on the "erase" button 315. Sections of the recording can be deleted by using the "start cut" button 319 and the "stop cut" button 321. Sections of different video recordings can be coupled to the recording using the "paste" button 323.

In an embodiment, the system includes the ability to import and export video, cut and paste sections of a video clip, add special effects and transitions. The system may also include editing tools such as speed adjustment 333 and color adjustment 329. Additional editing tools include audio tools 337 and synchronizing tools 339. In an embodiment, the system can encode the video for creation of a DVD, Web video, mobile phone video or video podcast. The video editing tool generally can provide some limited editing of the audio clips that accompany the video such as syncing an audio track with the video. Other special effects video features can include special features for creating special effects including: text strings that can be used for titles, frame rate speed change, color control, compositing, zoom and pan, etc.

Photo Tool

Figure 4:
FIG. 4 illustrates an embodiment of a photo tool.

With reference to FIG. 4, in an embodiment the system includes a photo tool may include a user interface that uses a camera capture an image of the user. Like the video tool, the photo tool may use a camera that is attached to or built into the computer. If the camera is attached to the computer the video recording can be stored on the computer memory. Alternatively, if the photo data is stored in the camera's internal memory or in a removable flash memory, it must be transferred to the user's computer. The computer's internal camera is used, the user interface may have a screen 437 that shows what the camera will capture. When the picture is properly framed, the user can actuate the camera to take the picture. It may be more common to use portable camera with the inventive system. In this embodiment, the camera's memory is coupled to the user's computer and the photos are downloaded from the camera memory using the "download" button 411. Once the photos are downloaded, they may be organized for a presentation to the recipient. The photo tool may display a single photo or have a series of photos that are displayed as a "slide show." The sequence of photos can be controlled using the "sequence" button 413. The user or creator may be able to control the time duration for each photo and the way that the photos are transitioned. The special effect transitions can be: push across, push down, wipe across, wipe down, wipe from center, etc.

The images can also be edited with tools in the system. For example, the photos may be cropped using the "crop" controls 413. The user interface may also include special image features, such as: shadow effects, polarization, pixilation, mosaic, enlarge/reduce, etc. that are accessed through the "image" button 417. The color may also be altered using the "color" button 419. The user may also be able to place text or drawings over a saved picture during editing. If portions of the photo need to be removed, the eraser 421 feature can be used. The delete 427 feature can be used to remove any unwanted photos. The rotation 423 feature can be used to rotate photos that were taken with the camera rotated 90 degrees. Once the presentation is at least partially complete, it can be saved using the save 425 feature.

Animation Tool

Figures 5, 6:
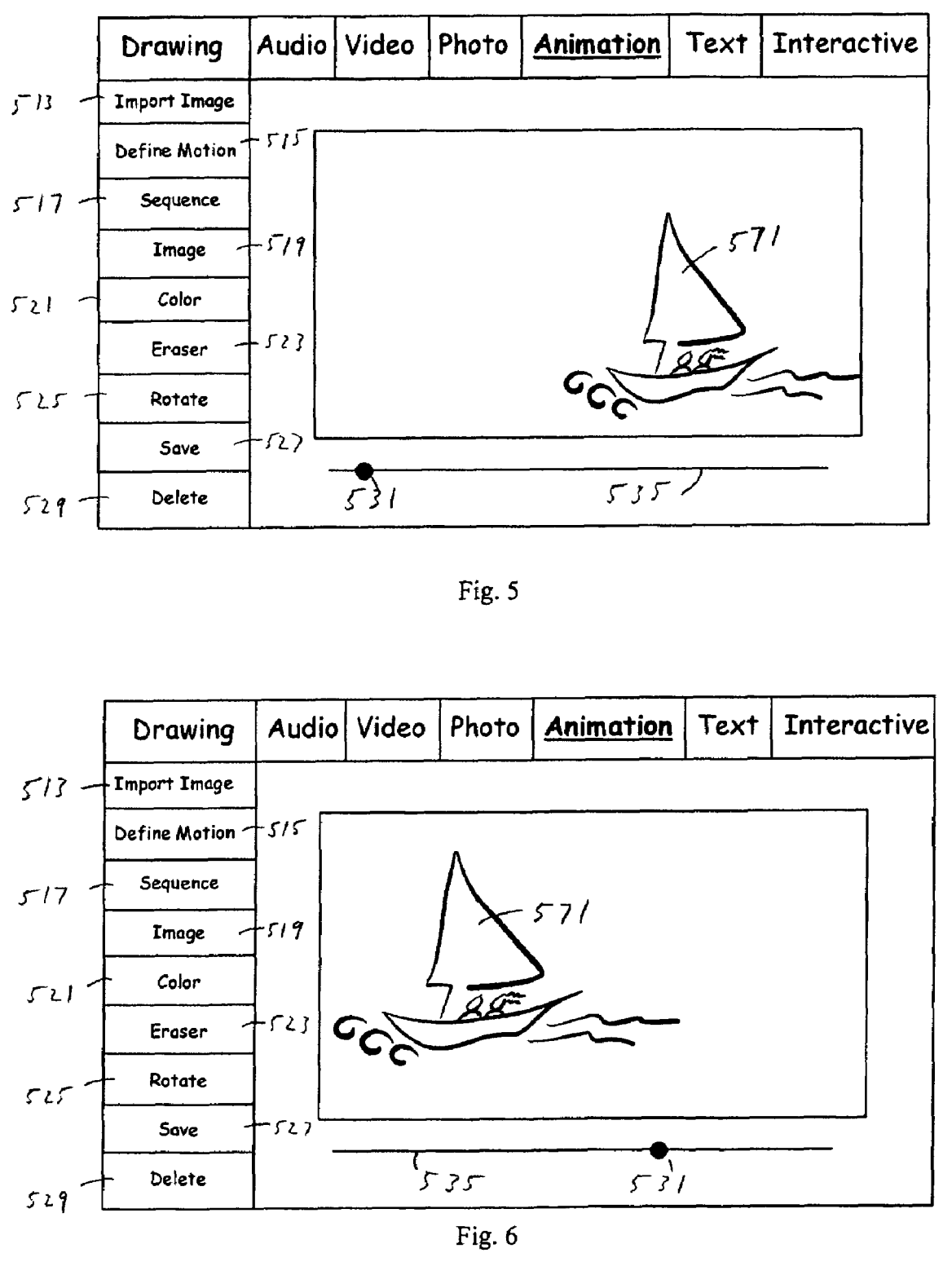

With reference to FIGS. 5 and 6, the inventive system may also include an animation tool that allows the user to create simple animations. These animations can include people, animals or vehicles moving in an entertaining manner, such as a dancing santa, squirrels driving scooters, babies flying hang gliders, etc. The animation tool may allow for text or drawings to be added to the animation. In an embodiment, the animation tool may allow a user to create an object or import an image and control the movement in an animated manner. The image to animate may be a two or three dimensional image that is selected using the "imported image" 513. In this example a sailboat image 571 is being used. FIG. 5 shows the sailboat image 571 at a first position and FIG. 6 shows the sailboat image 571 at a later point in time. Once the image is selected, the motion of the image is defined using the "define motion" button 515. In a simple embodiment, the velocity and direction of the image is controlled across the screen. In this case, the motion is a simple movement across the screen at a constant velocity.

To simulate three dimensional movement, the system may display images that are sequentially enlarged to simulate motion towards the view or sequentially reduced to simulate movement away from the viewer. In this embodiment, the animation may require preparing a sequence of images using the "sequence" 517 button. An individual frame of the animation sequence may be removed using the delete 529 button. Like the photo tool, the look of the image may be controlled with the image 519, color 521, eraser 523 and rotate 525 controls. The playback of the animation can be controlled with the Once the animation has been partially or fully prepared, the save 527 button may be used to store the work in memory.

Text Tool

Figure 7:
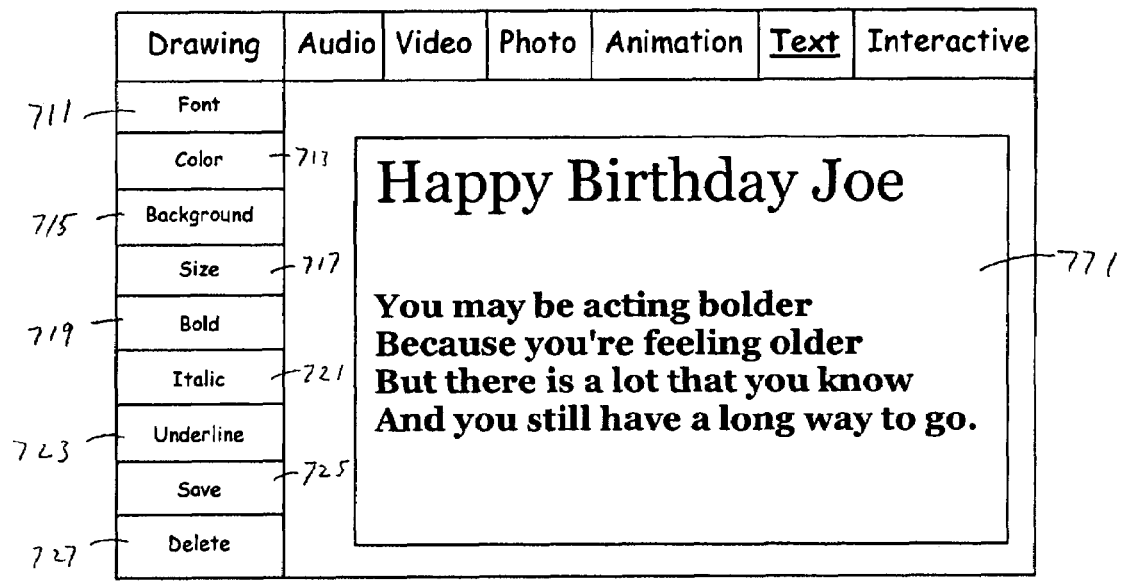
FIG. 7 illustrates an embodiment of the text tool.

The text tool includes a screen that allows the user to create text messages for the recipient using the computer keyboard. With reference to FIG. 7, the text tool allows the user to alter the appearance of a text message. The text tool includes various text fonts 711, colors 713 and sizes 717. The tools may also include bold 719, italic 721 and under line 723, similar to word processing controls. The background 715 control may allow the user to adjust the color of the background. The text tool may also include special effects such as text rotation, text animation, stretched or compressed text, non-linear text and multiple page text displays. The text tool may also be used in combination with any of the other tools to create drawings, pictures, animation, video and sounds works that also include text.

Interactive Tool

Figure 8:
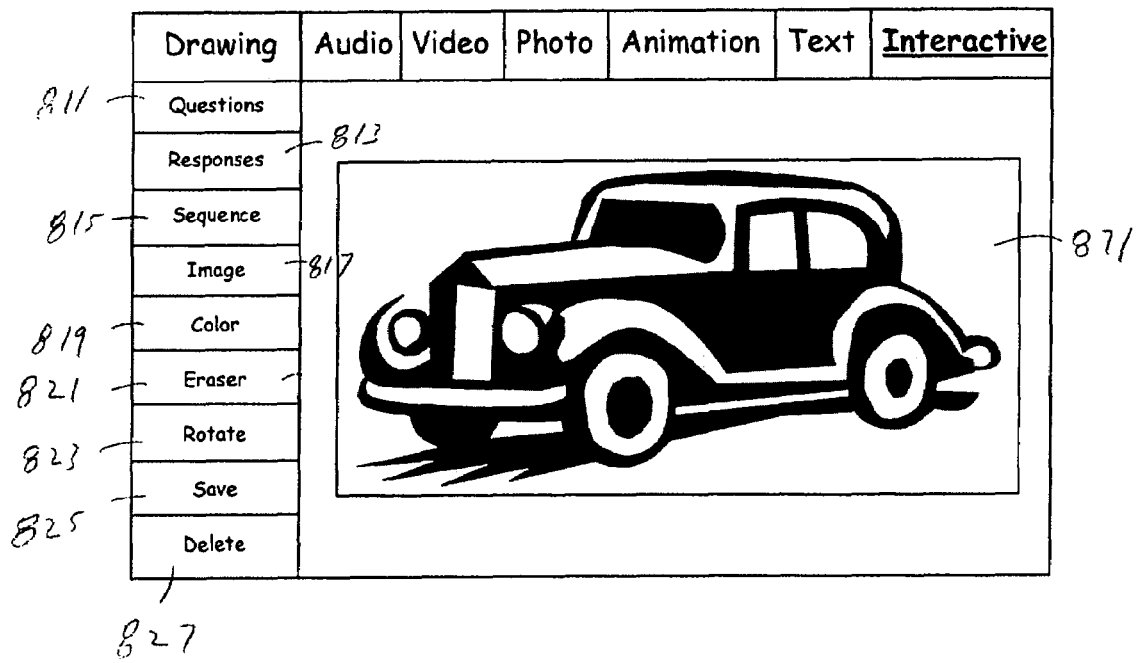
FIG. 8 illustrates an embodiment of the interactive tool.

With reference to FIG. 8, the interactive tool allows the creation of interactive artwork. The artist creates a series of conditional displays that depend upon input from the recipient. The user can input a series of interactive questions for the recipient through the questions control 811. The user can set up the various responses 813 and the sequence 815 of displays when the responses are input by the recipient which may include images that are input through the image button 817. When the user answers the questions, the system displays these images. For example, a first display has a picture of a birthday cake that does not have any birthday candles with the question "What year were you born?" The recipient can then input a year. The system may determine the age of the recipient and modify the cake to include the proper number of candles and an artist's drawing of the recipient at the specified age. The work may then ask if the recipient is male or female. Based upon the recipient's response the system may display an image of a present with an image of the recipient at the specified age and gender. If the user inputs male age 61+, an image of a limousine 871 may be displayed. Table 1 below shows a listing of possible images displayed according to the responses to the gender and age questions.

TABLE 1

| Gender/Age | Less than 16 | 16-35 | 36-60 | 61+ |
|---|---|---|---|---|
| Male | Bicycle | Car | Sports Car | Golf Cart |
| Female | Horse | Sports Car | SUV | Chauffeured Limousine |

Like several of the other tools, the images may be adjusted with a set of controls that may include: color 819, eraser 821, rotate 823, delete 827, etc. Once the interactive artwork is partially completed, it can be saved 825. While the interactive tool may be used to produce universal artistic works, it can also be used to create very personal works that are specific to the recipient.

As discussed, some of the tools may be combined to create a single multi-media work. For example, works created with the audio and visual tools can be combined. A visual display that is associated with the audio file. In this embodiment, the poster's computer may also include a digital video camera. When the play button is pressed, the audio and video may play back together. When used with a video signal, the user interface may also be some video controls to adjust the video playback. The video files may be MPEG or any other video format. These video controls may include, video window size, brightness, color, sharpness, etc. There may also be various visual effects, such as reverse colors, mosaic, pixilation, shadows, etc. In an embodiment, the video signal may be played out of synch with the audio signals.

The video signal does not necessarily have to be a digital movie. In an embodiment, a drawing or a still picture may be altered as the audio signal is played. The drawing or picture may pulse or the colors may be altered when certain audio frequency signals from the audio data are detected. For example, if the audio signal includes a rhythmic bass beat, the video image may be altered when the bass frequency pulse is detected. The picture may be of the poster and the video effect may switch the picture to a second picture of the poster in a different pose.

In an embodiment, each of the tools described above is a flash based application that can be used with web browser programs running on each of the collaborator's computers. In other embodiment, the software may be downloaded as a separate application program onto each collaborator's computer. The inventive system allows the tools to be used to create the works through each collaborator's computer. The collaborator can use the application programs by clicking of the desired tool with a pointing device such as a mouse. The user may also be able to control the operations of the artistic tools through the computer's keyboard.

Figure 9:
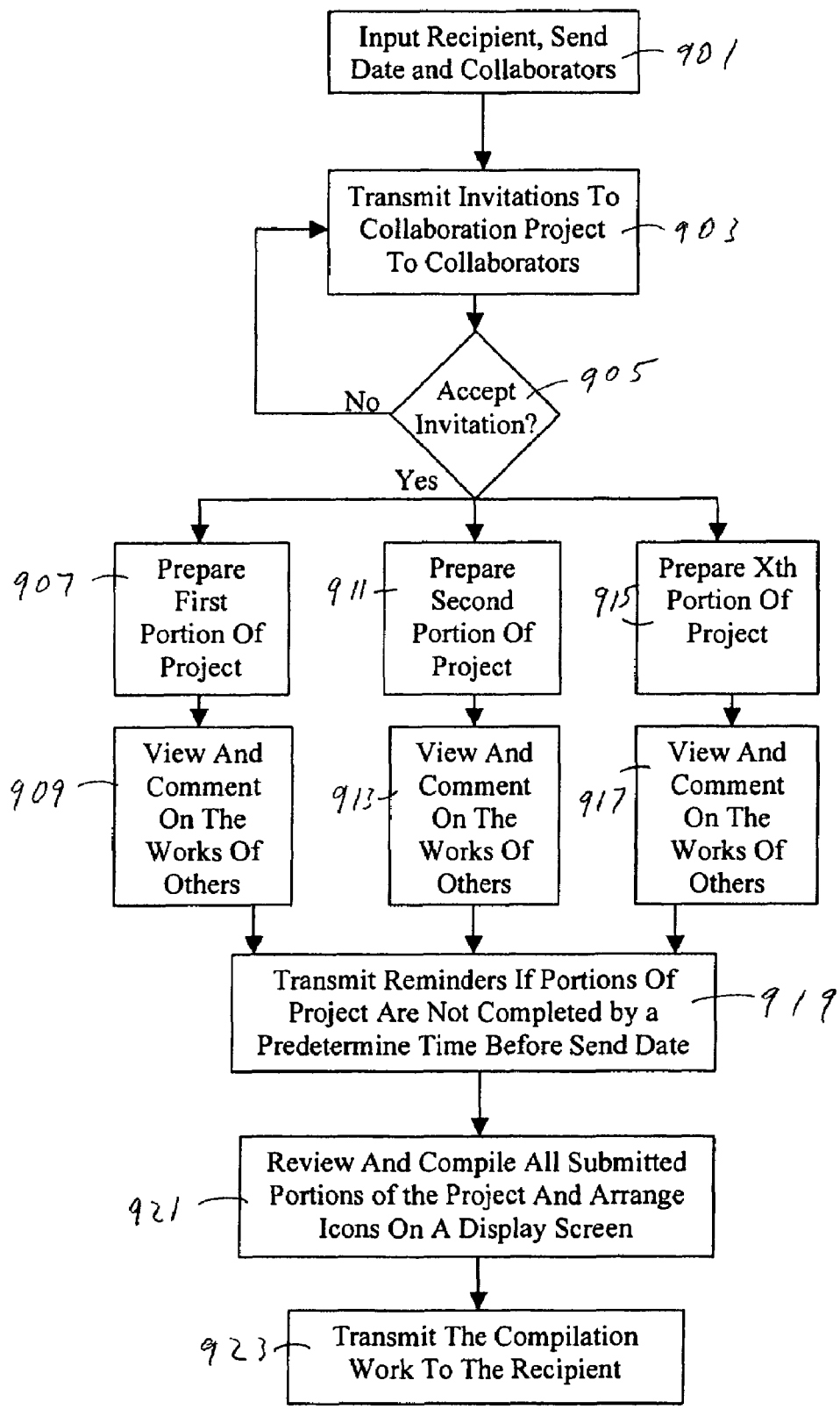
FIG. 9 is a flow chart of a process used by the inventive system.

There are various ways in which the collaborators can work on the artwork. The inventive system allows the users to work in parallel simultaneously or sequentially. With reference to FIG. 9, a user first sets up a collaborative project by inputting a recipient, a send date and a number of collaborators 901 through a computer to the system server. The system server sends each of the collaborators a notification of the project with a deadline date for completion 903. Each of the collaborators can either opt out of the project or decide to participate in the project 905. The system can then transmit the invitation to alternate collaborators. Once the collaborators have indicated acceptance of the project, they can begin working on their portion of the project 907, 911, 915. Because they may be working independently, they may wish to view and comment on the works of other collaborators 909, 913, 917. As the collaborators work on their portions of the project, they can periodically save their work to the server. The other collaborators may have access to view these works and with permission, they may also modify the works of others. By allowing users to see each other's work, they can obtain advice or avoid producing similar projects. The server can track the progress of the collaborators by checking the work saved by each collaborator. The system can also provide reminders for their clients to submit their works by the deadline as the deadline approaches 919.

Once the works have been submitted, the server will send an acknowledgement of the work receipt and ceases sending reminders to submit the work. The system or administrator then reviews and compiles the works and prepares icons that are associated with each work and arranges the icons in a display for the recipient 921. If one or more works are not submitted by the deadline, the system may proceed with compiling the works without all of the collaborators' works. The completed artwork are then sent to the recipient at the designated time 923.

Figure 10:
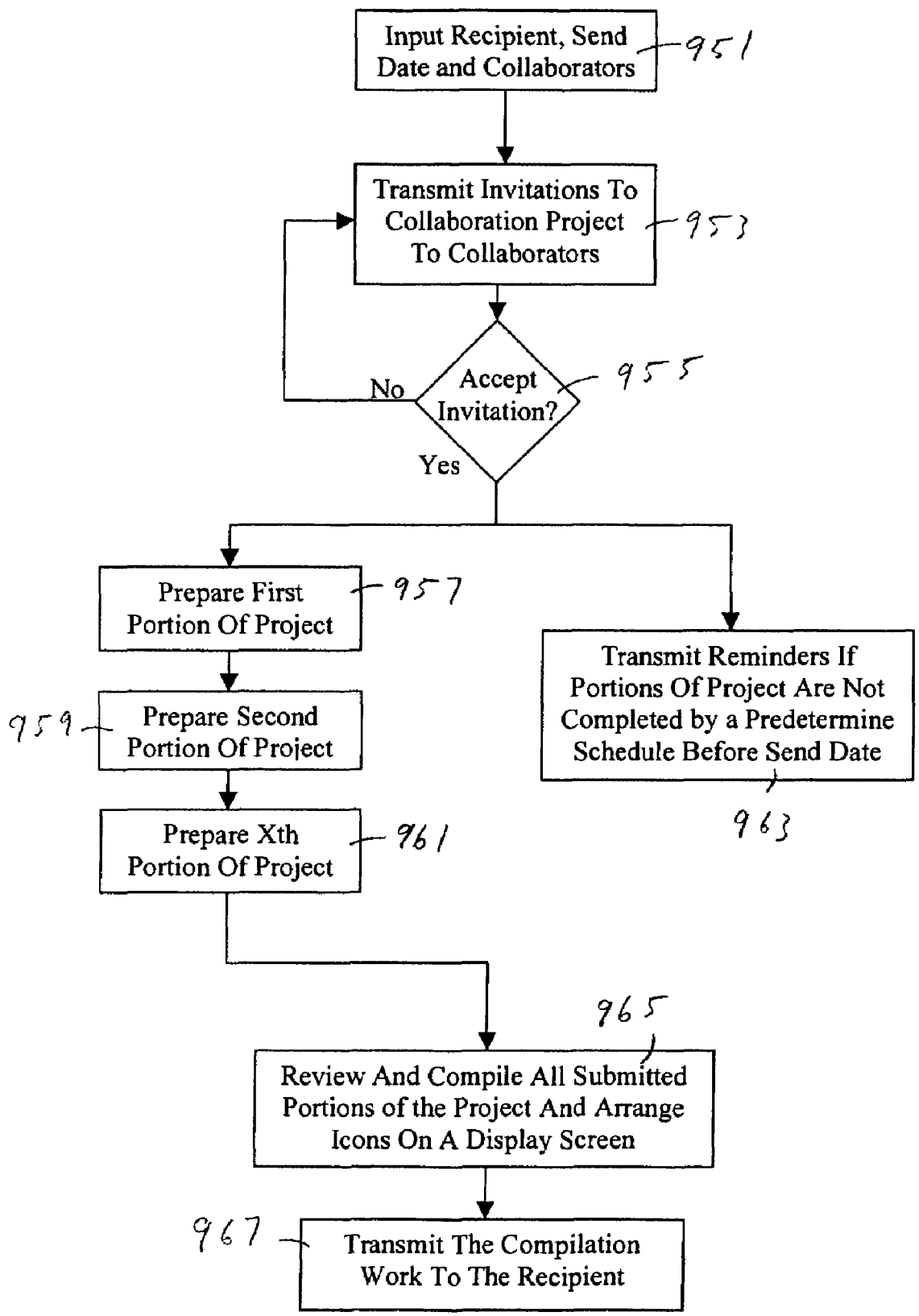
FIG. 10 is a flow chart of a process used by the inventive system.

With reference to FIG. 10, in another embodiment, the collaborators may work in a sequential manner in which one user completes a first portion of the work and then forwards the project to a second user for the second portion of the work. The project begins with a user inputting the recipient, the send date and collaborators 951. The system transmits the invitation to the project to the collaborators 953. The collaborators may or may not accept the invitation 955. The first collaborator works on a first portion of the project 957 and when the first portion is completed, work begins on the second portion 959. This sequential work 961 continues until all portions of the work are completed. The sequential work requires more time but allows the participants to see each other's work reducing the chance of redundancy. The system or administrator then reviews and compiles the works and prepares icons that are associated with each work and arranges the icons in a display 965. The finished works are then transmitted to the recipient 967.

The finished artwork can be transmitted as a link within e-mail, text message, instant message or any other type of communications so that the recipient can access the server and access the finished artwork. The recipient can enjoy the works through a viewer system that is a plug in with a browser program. The system may include a tool that allows the recipient to acknowledge receipt of the finished product and transmit a message to all of the artists, hopefully thanking them for their efforts. In an alternative embodiment, finished work can be an attachment to an e-mail, which can be downloaded and viewed without accessing the system server.

There are various ways to compile and display the works for the recipient. In an embodiment, each of the works may be reduced in size so that all of the works can be placed on a single display in a grid. For example, with reference to FIG. 11, the inventive system may display a first screen that shows 9 squares in a 3×3 grid 991. In an embodiment, the administrator configures the squares with icons for each of the collaborative works by clicking on the squares 995 and being prompted to fill the square by selecting from one of a number of types of items. Text may describe the type of work and the collaborator 981. The item may include: drawings, audio messages, video, text, photos, animations, etc.

In another embodiment, the collaborators may receive the grid and be able to select one of the icons as part of the work. Once the collaborator selects type of work, the tool used to create the work is activated. The user creates the artwork for the first box and then may create a different work of art for the second, third and fourth boxes. The user may be provided with standard works of art to choose from (for example, sample stock photos and greeting quotes might be provided). Each box can be filled with a different work of art.

Figure 12:
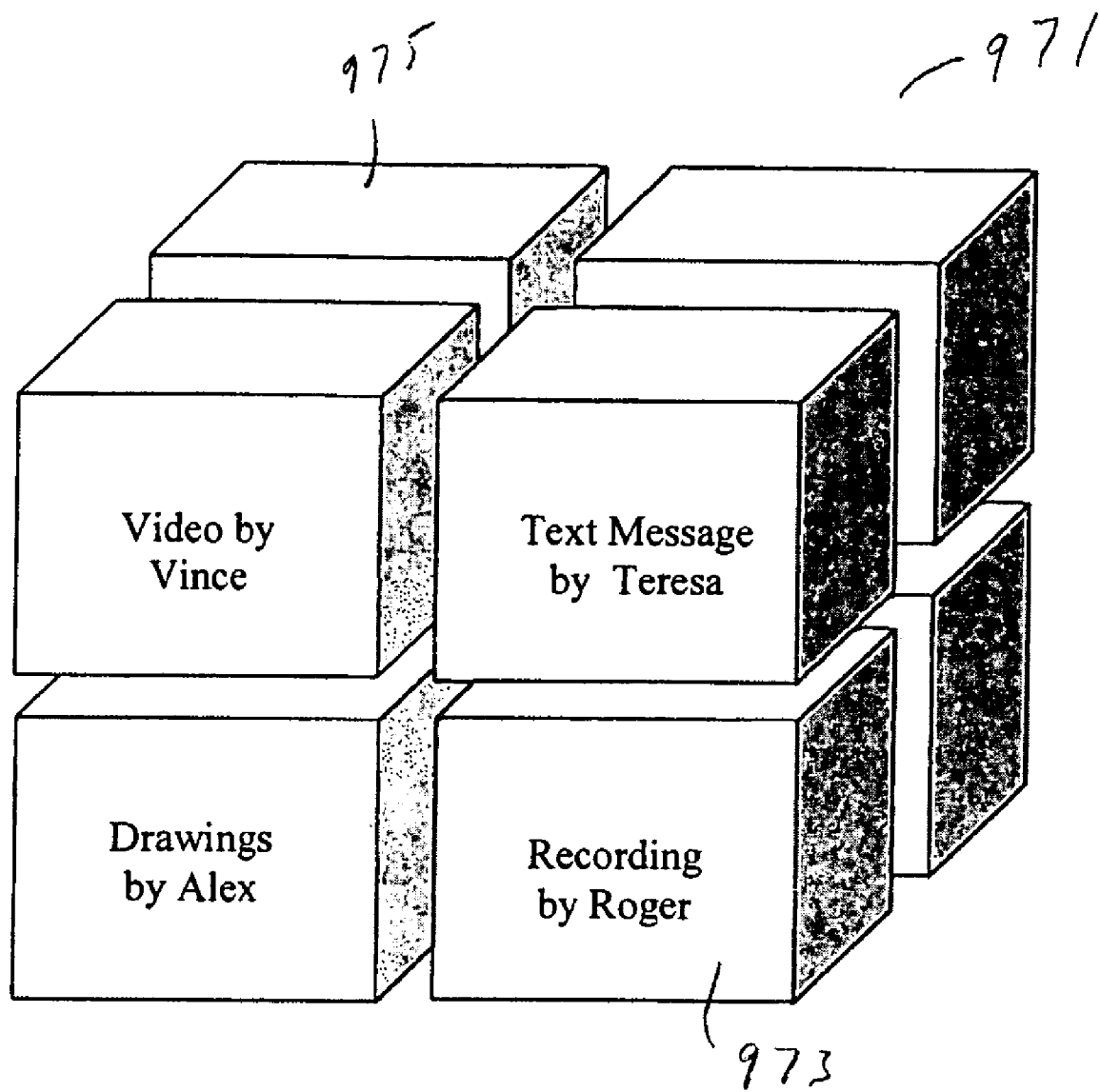
FIG. 12 is an embodiment of the collaborative artwork.

Although the invention has been described as being a 2×2 grid, it is also possible to create various other arrangements of multiple works. If the user wants to add additional works of art, the 2×2 grid can be expanded to 3×3 or 4×4, etc. Alternatively, the user can select the arrangement of the grid by inputting the number of rows and columns: 2×5, etc. In addition to two-dimensional configurations for the shapes for each work, as described above, it is also possible to create three-dimensional structures. For example, rather than a grid, boxes can be cubes arranged in a simulated three-dimensional configuration, or spheres arranged in a pyramid. With reference to FIG. 12, a 2×2×2 cube 971 is illustrated. Like the two dimensional arrangement, each of the blocks 973 in the cube can represent a different work of art. When the recipient selects an object by clicking on the object, a picture, drawing or video creative work is expanded to fill all or a portion of the recipient's computer screen. If the work is an audio recording this may be played back without altering the visual image. The recipient may be able to toggle between the individual works and the three dimensional structure by clicking on a button in the graphical user interface.

In the three dimensional structure, some objects 975 may be hidden. The recipient may be able rearrange the structures by clicking and dragging objects to access the works associated with hidden structures. Alternatively, the entire assembly may be rotated or once a structure is accessed and viewed, it may disappear from the three-dimensional structure allowing access to the next object.

The inventive system allows the user to select the date and time that the artistic creation is transmitted to the recipient. Alternatively, the system may send an e-mail to the recipient that includes a link to the web site where the creation can be downloaded and/or viewed. The recipient can then click on an acknowledgement tab that allows the user to reply to the creator of the message with a brief thank you note. Although the recipient is described as a single individual, it is also possible to sent the finished work to a plurality of people. For example, the cumulative works can be used to create an invitation to a party, event, fundraiser, premier, etc. The finished works would then be transmitted as the invitation to numerous people.

In an embodiment, there is a review system which allows the originator of the card to preview all works and approve their content before the completed artistic works are sent to the recipient. When the drawing and text are completed the drawing tool transmits the text and drawings files to the server computer. The program receives and saves the creative work files. The works may be screened by an administrator or a screening application before being transmitted to prevent the publication of inappropriate text or illustrations. The level of screening may depend upon the recipient. Web pages for small children will have a much higher standard for offensiveness than a web page for adults. If a machine performs an automated screening process, it may scan the illustration and compare certain features of the illustration to a set of predefined offensive shapes such gang or hate symbols, etc. In an embodiment, these set of offensive shapes and text are stored in a database memory. When an illustration is scanned, an image of each line or shape in the illustration is compared to the database of offensive illustrations. If there is a match or a similarly between the illustration and the offensive shape, the system can transmit an error response to the user or simply block the illustration from being posted. The poster can revise the drawing to remove the offensive illustration or post a new drawing. Similarly, the text may be scanned for inappropriate words and phrases. Alternatively, there may be an automated system which screen for certain offensive material by performing a word search of all the text in the works, as well as photos, video, drawings and audio recordings, etc and notifying the originator if there is any possibly offensive information. This is filtering or screening process is particularly useful if the recipient is a child or minor.

In an embodiment, there is a system that prevents artists from being anonymous and producing inappropriate works. To discourage this type of behavior, the artists submitting works may need to be invited by a known user or administrator. Alternatively, if the artists are invited by emailed invitations, they may be required to validate their e-mail address.

In an embodiment, the initiator of the creative work must subscribe to a service that provides the service and tools described above. The subscription may require payment for unlimited use or payment per artistic creation that allows all collaborators with access to the tools required to prepare the art works. The subscription fee may be based upon use annually, monthly, any predetermined time period. Alternatively, a fee may be charged per single or for multiple uses. After a user is charged for the user of the feature, the additional contributors may not be charged for the use of the same tools to create a portion of the artistic work. Alternatively, use of the web site may be free and revenues may be generated by advertisements placed on the web site.

As illustrated in the figure of the present application and described herein, aspects of the present invention may be implemented on one or more computers executing software instructions. According to one embodiment of the present invention, server and client computer systems transmit and receive data over a computer network or standard telephone line. The steps of accessing, downloading, and manipulating the data, as well as other aspects of the present invention are implemented by central processing units (CPU) in the server and client computers executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers.

In the foregoing, a system has been described for coordinating the creation of multi-piece or collaborative artistic works and transmitting these works to one or more recipients. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for creating collaborative artwork comprising the steps:
   providing a server computer, a plurality of user computers that are coupled to a computer network and a multimedia program running on the server computer having a graphical user interface and a plurality of tool programs for creating and displaying a collaborative artwork;
   inputting a recipient and a send date into the server computer;
   transmitting a notification of the collaborative artwork and the send date to a plurality of collaborators;
   producing a first portion of the collaborative artwork through a first user computer using a drawing tool and saving the first portion of the collaborative artwork on the server computer;
   producing a second portion of the collaborative artwork through a second user computer and saving the second portion of the collaborative artwork on the server computer;
   transmitting a reminder message to the first user computer if the first portion of the collaborative artwork is not received by the server computer by a predetermined time prior to the send date;
   transmitting a reminder message to the second user computer if the second portion of the collaborative artwork is not received by the server computer by a predetermined time prior to the send date;
   combining the first portion of the collaborative artwork and the second portion of the collaborative artwork in the server computer;
   sending the combined collaborative artwork from the server computer to a recipient computer on the send date;
   displaying a first icon associated with the first portion of the collaborative artwork and a second icon associated with the second portion of the collaborative artwork on a display coupled to the recipient computer;
   displaying the first portion of the collaborative artwork if the first icon is selected using a pointing device coupled to the recipient computer; and
   displaying the second portion of the collaborative artwork if the second icon is selected using a pointing device coupled to the recipient computer.

2. The method for creating the collaborative artwork of claim 1 further comprising the step:
   playing the second portion of the collaborative artwork if the second area is selected with the pointing device;
   wherein the second portion of the electronic artwork is created with an video tool.

3. The method for creating the collaborative artwork of claim 1 further comprising the step:
   displaying the second portion of the collaborative artwork if the second area is selected with the pointing device;
   wherein the second portion of the collaborative artwork is created with an photo tool.

4. The method for creating the collaborative artwork of claim 1 further comprising the step:
   playing the second portion of the collaborative artwork if the second area is selected with the pointing device;
   wherein the second portion of the collaborative artwork is created with an animation editing tool.

5. The method for creating the collaborative artwork of claim 1 further comprising the step:
displaying the second portion of the collaborative artwork if the second area is selected with the pointing device;
wherein the second portion of the collaborative artwork is created with a text tool.

6. A method for creating collaborative artwork comprising the steps:
providing a server computer that is coupled to a computer network and a multi-media program running on the server computer having a graphical user interface and a plurality of tool programs for creating and displaying a collaborative artwork;
inputting a recipient and a send date into the server computer;
transmitting a notification of the collaborative artwork and the send date to a plurality of collaborators;
receiving, by the server computer, a first portion of the collaborative artwork from a first client computer produced using a drawing tool and saving the first portion of the collaborative artwork on the server computer;
receiving, by the server computer, a second portion of the collaborative artwork from a second client computer and saving the second portion of the collaborative artwork on the server computer;
transmitting, from the server computer, a reminder message to the first client computer if the first portion of the collaborative artwork is not received by the server computer by a predetermined time prior to the send date;
transmitting, from the server computer, a reminder message to the second client computer if the first portion of the collaborative artwork is not received by the server computer by a predetermined time prior to the send date;
combining the first portion of the collaborative artwork and the second portion of the collaborative artwork by the server computer;
sending the combined collaborative artwork from the server computer to a third client computer on the send date;
displaying a first icon associated with the first portion of the collaborative artwork and a second icon associated with the second portion of the collaborative artwork on a display coupled to the third client computer;
displaying the first portion of the collaborative artwork if the first icon is selected using a pointing device coupled to the third client computer; and
displaying the second portion of the collaborative artwork if the second icon is selected using a pointing device coupled to the third client computer.

* * * * *

UNITED STATES PATENT AND TRADEMARK OFFICE
CERTIFICATE OF CORRECTION

PATENT NO. : 7,596,598 B2  
APPLICATION NO. : 11/546159  
DATED : September 29, 2009  
INVENTOR(S) : Michael Birch It is certified that error appears in the above-identified patent and that said Letters Patent is hereby corrected as shown below:

Title page item 73  
The patent incorrectly lists the assignee as Birthday Alarm, LLC. The correct assignee is Bebo, Inc.

Signed and Sealed this

Twenty-third Day of February, 2010

David J. Kappos  
*Director of the United States Patent and Trademark Office*